United States Patent [19]
Gillespie

[11] Patent Number: 5,619,258
[45] Date of Patent: Apr. 8, 1997

[54] IMAGE STABILITY IN TELECINES

[75] Inventor: John D. Gillespie, London, United Kingdom

[73] Assignee: Rank Cintel Limited, United Kingdom

[21] Appl. No.: 23,615

[22] Filed: Feb. 26, 1993

[30] Foreign Application Priority Data

Feb. 28, 1992 [GB] United Kingdom .................. 9204336

[51] Int. Cl.⁶ .............................. H04N 3/36; H04N 5/253; H04N 9/11; H04N 9/47
[52] U.S. Cl. ............................. 348/97; 348/102; 348/208
[58] Field of Search ................................. 348/97, 98, 99, 348/100, 102, 103, 105, 106, 108, 208, 207

[56] References Cited

U.S. PATENT DOCUMENTS

| | | | |
|---|---|---|---|
| 4,833,544 | 5/1989 | Sato et al. | 348/105 |
| 4,897,729 | 1/1990 | Mumford et al. | 348/103 |
| 4,984,086 | 1/1991 | Mumford et al. | 348/103 |
| 5,189,518 | 2/1993 | Nishida | 348/208 |
| 5,194,958 | 3/1993 | Pearman et al. | 348/97 |

FOREIGN PATENT DOCUMENTS

| | | | |
|---|---|---|---|
| 187913 | 4/1987 | United Kingdom | H04N 5/253 |
| 2187913 | 9/1987 | United Kingdom | H04N 5/253 |
| 2165417 | 10/1988 | United Kingdom | H04N 5/253 |

*Primary Examiner*—Michael T. Razavi
*Assistant Examiner*—Bipin Shalwala
*Attorney, Agent, or Firm*—Ostrolenk, Faber, Gerb & Soffen, LLP

[57] ABSTRACT

A telecine uses a flying-spot scanner to derive video images from a film. A scan control circuit is used to control the scan of the flying-spot to introduce special effects. Pairs of successive images may be misaligned and a motion vector estimator is used to detect the amount of misalignment. This produces a shift vector for an image stabilizer to shift one of the images of a pair. The motion vector estimator also receives data from the scan control circuit relating to any special effect in the images and corrects the shift vector in dependence on this.

14 Claims, 1 Drawing Sheet

IMAGE STABILITY IN TELECINES

BACKGROUND OF THE INVENTION

This invention relates to systems for stabilizing video images and in particular to systems for use in telecines.

Telecines suffer from image stability problems. A film is transported through the telecine's optical system by a complicated series of mechanical devices which use the sprocket holes in the film to guide it through a predetermined path of travel. As a film is used the sprocket holes will be subjected to wear and tear thus making it impossible to use them accurately to position every frame of the film in the telecine.

Furthermore, if the film passing through the telecine is a print from an original a variable error in the position of the actual image relative to the film edges will be present as a result of the process by which copies of the film are made. The sprocket holes in the original would be subject to wear and tear and the error in positioning the original when making a copy will contribute to this variable error. In such a case a telecine which had error correction to produce 100% image stability would still produce an unsteady video image.

Motion vector estimation techniques are well known in video systems and are used to identify the motion of a whole video frame or a portion thereof relative to its immediate predecessor. In a telecine this information can be used to correct the position of the current frame of the video signal relative to its predecessor thereby producing a stable output image. Preferably a motion vector estimator is used which has sub-pixel accuracy since even very small positional errors can be noticed by the human eye in certain situations, for example, when electronically generated titles are overlaid on a transferred sequence these are completely steady with respect to the image edges.

It is sometimes desired to change the shape and size of the images in a sequence in situations such as when two pieces of film material are to be joined by a matte process. The alteration to the shape and size can be achieved by use of a digital image processor after scanning of the film by the telecine. However, the effectiveness of this is limited by the resolution of the original sampled images. This can cause problems with image rotation and image zooming and resultant images are likely to be either very "soft" or "pixellated".

The Rank Cintel URSA telecine incorporates a scanning mechanism which allows special effects such as image rotation and image zooming to be carried out before a digital representation of the image is produced, thereby maintaining image resolution. This is achieved by altering the shape of the flying spot scan to that of the desired effect. For example, an image zoom is accomplished by scanning the same number of lines in a reduced area of the film. Image pans, rotations, and other effects such as image stretching can also be performed in this way.

Using the known technique of Producing motion vectors between successive frames of the image to correct for film instability does not work when such a zoom, pan, or other special effect has been included and has altered the shape of the flying spot scan. This is because the motion vector estimation technique tracks the global motion of the image from frame to frame and would be unable to separate out motion due to scanning effects from motion due to film instability.

SUMMARY OF THE INVENTION

Preferred embodiments of the present invention enable motion vector estimation to be used to correct for film instability even when special effects are incorporated by altering the shape of the flying spot scan.

More specifically a preferred embodiment of the invention provides a system for stabilizing video images produced from an unsteady film source in a telecine. A shift signal is estimated representing an alignment error between pairs of successive video images. This can then be used to shift one of the images of a pair and thereby correct for instability. Special effects such as pans, zooms etc. are introduced into the sequence of video images and the effect of the shift signal has to be corrected to take account of any special effect which has been used.

The invention is defined with more precision in the appended claims to which reference should now be made.

DETAILED DESCRIPTION OF A PREFERRED EMBODIMENT

The invention will now be described in detail by way of example with reference to the accompanying drawings in which.

Figure 1:
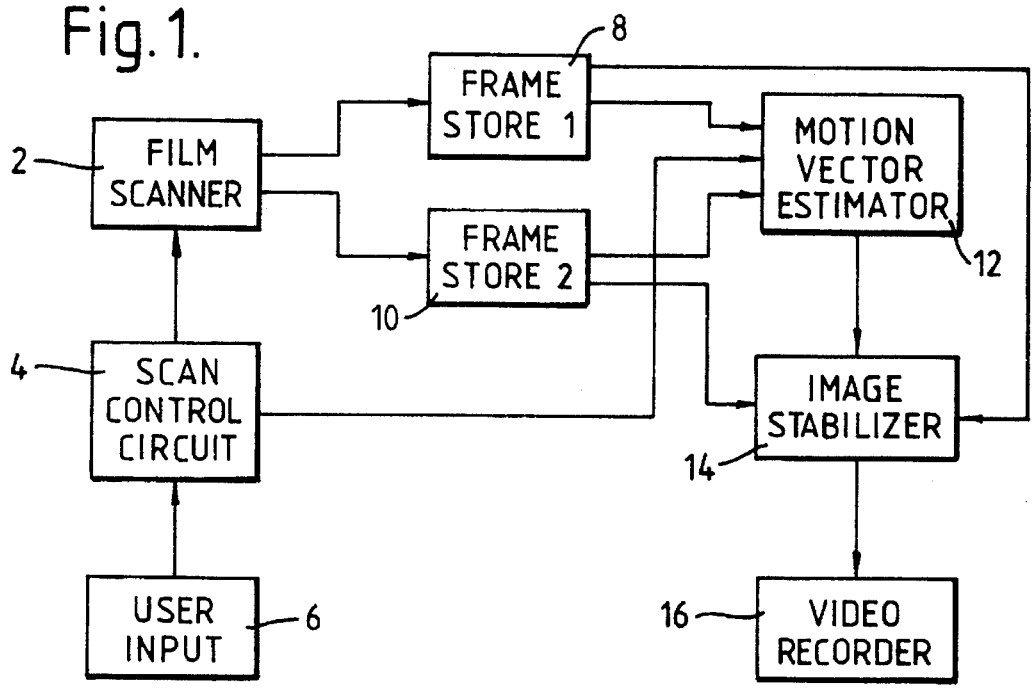
FIG. 1 shows a block diagram of a telecine system embodying the invention.

The telecine of FIG. 1 comprises a film scanner 2 of the flying spot type which includes a mechanical transport mechanism to guide the film through the flying spot optical scanner. This is coupled to a scan control circuit 4 which produces signals to control the scanning of the film by the flying spot. This control circuit 4 can introduce special effects such as zooms, pans, rotations, etc. A user input 6 is used to programme a sequence of special effects for the scan control circuit 4 and when a film is played through the film scanner 2 these will be implemented in sequence in response to time codes provided on the film.

The film scanner 2 provides digital video signals representing the film with frames of the video signal being provided alternately to framestore (1), 8 and framestore (2), 10.

The outputs of the framestores 8 and 10 comprise inputs to a motion vector estimator 12. This compares the successive frames from the two framestores and from these produces an overall shift signal from the image in a first one of the framestores to the image in a second one of the framestores. This overall shift signal is representative of the error caused by film instability in the film scanner. There are many known methods for producing such a shift signal or motion vector from a pair of successive images and these will be well known to those skilled in the art.

The overall shift signal is sent to an image stabilizer 14 which alternately receives the frame of video data stored in framestore (1) and framestore (2) respectively. Whichever framestore is storing the later frame in the sequence of video images is the one which provides the input to the image stabilizer. The image stabilizer uses the overall shift signal (motion vector) representing the error in alignment between the two frames of video data to shift the most recent frame such that it is aligned with its predecessor. For example, if the film scanner instability causes the image to shift to the right by 0.8 pixels between two successive frames then the motion vector estimator will produce a shift signal of 0.8 pixels. The image stabilizer 14 will then shift the later one of the images stored in the two framestores to the left by 0.8 pixels and will then output it for storage on a video recorder 16.

Shifting of the video signal is achieved by substituting interpolated data derived from the inputs provided by the framestore(s). This is required so that when the shift signal indicates a shift to a fractional part of a pixel position, accurate new data is obtained.

The motion vector estimator 12 also receives signals from the scan control circuit corresponding to any pans, zooms, etc which have been implemented by controlling the scan of the flying spot in the film scanner 2. This signal is a scan control vector.

The scan control vector received by the motion vector estimator 12 is used to correct the most recent frame of the video signal by offsetting it, to compensate for any scan effect prior to generation of a motion vector representing film instability. Thus the comparison made between pixels in successive frames is not necessarily made between pixels with the same locations in the frames but, where a scan effect is present, between pixels which are offset from each other by an amount equal to the scan control vector for that pixel in the most recent frame of the video signal. Therefore, if the scan control circuit produces an offset of 4 pixels to the right the motion vector estimator will compare the value of a current pixel with that of a pixel 4 pixel locations to the left in the previous frame. A motion vector will then be produced to correct the current frame for any film instability in the film scanner 2.

The image stabilizer 14 receives the motion vector and shifts the most recent frame of video data to correct for the film instability. This may be achieved by interpolating new lines of video data. In this embodiment the image stabilizer will implement the necessary linear shift on the video signal.

The reason the correction for the scan effects is implemented before the motion vector estimation is performed is to reduce the amount of processing involved. The amount of processing involved in motion vector estimation increases as displacement between the two images increases. It is known to limit motion vector estimation to a set range and therefore if the scan effect correction is applied before motion vector estimation the range can be minimised.

Preferably a motion vector estimator is used which can estimate shifts to sub-pixel accuracy. However, to make its processing simpler it is more straightforward to provide only an integer part of a scan control vector to the motion vector estimator 12 and then correct by the fractional part. For example, if the scan effect is a left shift by 4.34 pixels the motion vector estimator is told that it is 4 pixels. Image instability causes a shift to the right by 0.8 pixels. The motion vector estimator produces a correction signal indicating a shift to the right of 4−(4.34−0.8), i.e. 0.46 pixels. This is then corrected by the fractional part of the scan control vector, 0.34, to produce the correct overall shift signal of 0.8 pixels.

An alternative embodiment of the invention involves correction for scan control effects after the motion vector estimation. This will of course involve more processing in the motion vector estimator. In this alternative embodiment the image stabilizer is used to combine the output of the motion vector estimator and the scan control circuit to provide an overall shift signal for the most recent frame of the video signal.

Figure 2:
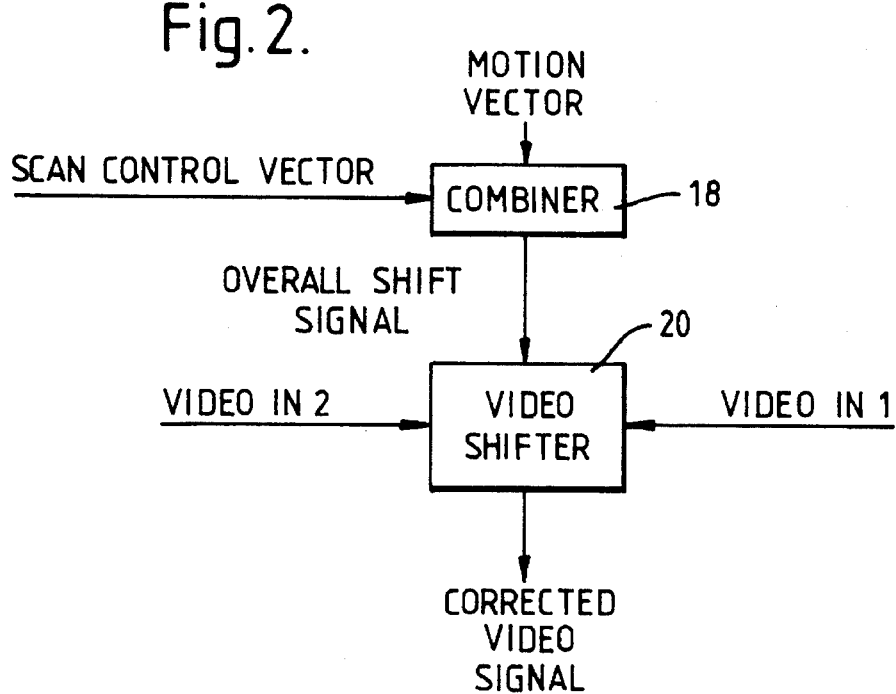
FIG. 2 shows a block diagram of an image stabilizer for use in an embodiment of the invention.

A block diagram of the alternative embodiment of image stabilizer is shown in FIG. 2. In this the motion vector and the scan control vector comprise the input to a combiner circuit 18 which provides the overall shift signal representing the film instability. For example, if the scan control vector indicated a pan of 4 pixels to the left and the error in film position caused a shift of one pixel to the right between a pair of successive frames then the motion vector estimator would produce a vector representing 3 pixels to the left. The overall shift signal output by the combiner 18 would be one pixel to the left. A video shifter or interpolator 20 receives this overall shift signal along with signals from framestores (1) and (2) on two respective video inputs. It is arranged so as to receive a video signal from the framestore which contains the most recent frame in the sequence. It implements the overall shift or interpolation on the current frame of video data and outputs a corrected video signal which has been so shifted/interpolated.

It will be appreciated that for simple linear movements such as up and down pans the production of scan control vectors is a straightforward process. However, for more complex operations such as rotations and zooms equivalent horizontal and vertical vectors have to be produced. The magnitude of these vectors will vary from pixel to pixel. The simplest way to produce these vectors is to provide a look-up-table associated with the scan control circuit storing a set of vectors for each possible special effect which can be performed.

It will be appreciated that the present invention can be applied to any form of image manipulation system in which the source image suffers from some form of unsteadiness.

I claim:

1. A system for stabilizing video images produced from an unsteady source of a sequence of images comprising:
    means for producing a sequence of video images from said source;
    means for receiving two successive ones of said video images from said video image producing means;
    means for estimating a shift signal connected to said means for receiving images, said shift signal representing an error between said two successive images, said error resulting from unsteadiness in said unsteady source;
    means for controlling said image producing means whereby special effects are introduced in said sequence of video images;
    means, responsive to a signal from said controlling means and to said shift signal, for producing a corrected Shift signal compensated to take account of any special effect introduced in said sequence of video images by said controlling means; and
    means for receiving said corrected shift signal and said sequence of video images and for shifting one of said two successive ones of said video images in accordance with said corrected shift signal.

2. A system for stabilizing video images according to claim 1 wherein means are provided for storing a pair of successive video images of said sequence and for supplying said pair of images to said shift signal estimating means.

3. A system for stabilizing video images according to claim 1, wherein said source of images is a cinematographic film.

4. A system for stabilizing video images according to claim 3, wherein said video image producing means is a telecine.

5. A system for stabilizing video images according to claim 1, wherein said shift signal estimating means comprises a motion vector estimator.

6. A system for stabilizing video images according to claim 1, wherein said shift signal estimating means has sub-pixel accuracy.

7. A system for stabilizing video images according to claim 3, wherein said image producing means comprises a flying-spot-scanner.

8. A system for stabilizing video images according to claim 7 wherein said controlling means so controls said flying spot scanner as to produce a special effect in the output image.

9. A system for stabilizing video images according to claim 1 wherein said shift signal correcting means is included in the shift signal estimating means.

10. A system for stabilizing video images according to claim 1 wherein said shift signal is used to shift a current image in the sequence of video images.

11. A system according to claim 1, wherein said means for receiving and shifting one of said video images comprises interpolating means.

12. A telecine comprising:

a flying-spot-scanner for producing a sequence of video images from a sequence of images on a cinematographic film;

means for controlling said flying spot scanner to produce special effects in said sequence of video images;

means for producing a shift signal representative of an error between two successive ones of said video images, said error resulting from unsteadiness of said cinematographic film in said flying spot scanner;

means responsive to a signal from the scan control means, for correcting said shift signal to take account of any special effect introduced by said flying-spot scanner and producing a corrected shift signal, and means for shifting one of said two successive video images in accordance with said corrected shift signal.

13. A method for correction for film unsteadiness in a telecine comprising:

scanning a sequence of cinematographic images with a flying spot scanner to produce a sequence of video images;

controlling said flying-spot scanner to introduce special effects in said sequence of video images;

receiving two successive ones of said video images;

estimating a shift signal representing an error in alignment between said two successive images in the sequence;

correcting said shift signal to take account of any special effects introduced by said scan control means and producing a corrected shift signal;

shifting one image of each said two successive images in accordance with said corrected shift signal, thereby correcting for film unsteadiness.

14. A method for stabilizing video images produced from an unsteady source of a sequence of images comprising:

producing a sequence of video images from said source;

introducing a special effect in said sequence of video images;

receiving two successive ones of said video images;

estimating a shift signal representing an error between said two successive images in said sequence, said error resulting from unsteadiness in the unsteady source;

correcting said shift signal to take account of any special effect introduced in said sequence of video images, and shifting one of said two successive video images in accordance with said corrected shift signal.

* * * * *